April 4, 1944. C. C. FAWCETT 2,345,910
CONNECTION FOR ELEMENTS OF A ROTATABLE UNIT
Filed Jan. 4, 1939
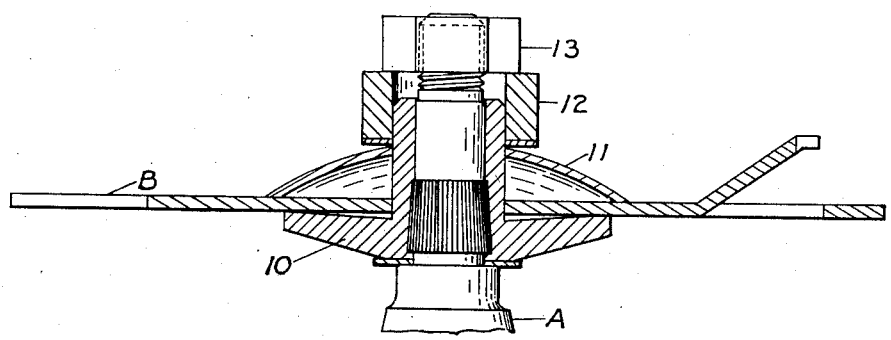
Fig_1_
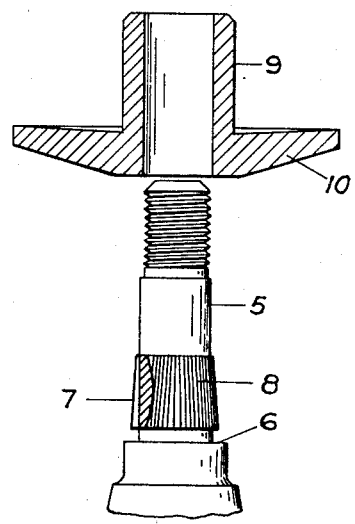
Fig_2_
Inventor
Cecil C. Fawcett
By Kesserich & J H Church
Attorneys Patented Apr. 4, 1944

2,345,910

UNITED STATES PATENT OFFICE 2,345,910

CONNECTION FOR ELEMENTS OF ROTATABLE UNITS

Cecil C. Fawcett, Philadelphia, Pa., assignor to the United States of America, as represented by the Secretary of War Application January 4, 1939, Serial No. 249,262

2 Claims. (Cl. 161—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to a connection for elements of a rotatable unit, and more particularly it has reference to means for connecting two members of a timing mechanism, such as a timing disk bushing and shaft.

In timing mechanisms as used in mechanical time fuses it has been the usual practice to connect the timing disk bushing to the pinion shaft by a conical force fit. Because of the setback forces developed in firing a projectile from a gun such a connection is frequently loosened and permits angular displacement of the bushing relative to the shaft, with the result that the timing disk carried by the bushing is displaced and the timing of the fuse will be inaccurate.

The purpose of this invention is to provide a simple and effective connection which will securely hold the bushing in position against the action of the setback force when a projectile is fired from a gun.

The specific nature of the invention as well as other objects and advantages thereof will clearly appear from a description of a preferred embodiment as shown in the accompanying drawing in which:

Fig. 1 is a view partly in side elevation and partly in longitudinal section of the improved timing disk and shaft connection with the parts in assembled position.

Fig. 2 is a fragmentary longitudinal sectional view showing the arrangement of the parts prior to assembly.

Referring to the drawing by characters of reference there is shown a shaft A which is formed as a pinion for a timing mechanism and a member B such as a timing disk which is to be normally rotated with the shaft but which is also to be capable of relative movement to position it with respect to other mechanism in determining the set-time functioning of a fuse.

The shaft A of a hard metal such as steel is formed with a reduced portion 5 establishing a shoulder 6. The portion 5 includes a tapered collar 7 formed with serrations 8 and the grooves between serrations are preferably of a depth to be coextensive with the exterior surface of the portion 5. The end of the tapered collar having the maximum diameter is adjacent to and spaced from the shoulder 6 while the end having the minimum diameter is disposed towards the assembly end of the shaft.

A bushing 9 of a soft metal such as brass has an internal diameter that is less than the diameter of the tapered collar. In applying the bushing to the reduced portion 5 and moving it into engagement with the shoulder 6 the serrations 8 will cut into the brass and the bushing will be securely held against angular displacement relative to the shaft.

The timing disk B is mounted on the body of the bushing and is supported by an annular flange 10 on the bushing. Flange 10 is slightly concave upwardly, as shown in the drawing, to provide substantially line contact between the flange and the disk; such contact gives adequate static friction to prevent accidental displacement of the timing ring, yet provides a minimum of resistance to setting of the fuse. A resilient washer 11 embracing the bushing and engaging the disk B is retained by a ring 12 and a nut 13 threaded on the end of the shaft. The nut and ring serve to regulate the pressure exerted by the washer on the disk and this connection provides for normal unitary rotation of the bushing and disk while permitting the disk to be moved relatively to the bushing to establish the set-time frictioning of the fuse.

I claim:

1. In a clockwork time fuse, a shaft having a shoulder and a tapered collar with its maximum diameter adjacent to and spaced from the shoulder, said collar provided with serrations, a bushing having an internal diameter less than the diameter of the serrated collar, said bushing moved into position against the shoulder whereby the serrations cut into the bushing, an annular flange on the bushing, a disk mounted on the bushing and supported by the flange, a resilient washer engaging the disk, and means on the shaft for holding and exerting pressure on the washer.

2. A shaft having a shoulder and a tapered collar with its maximum diameter adjacent to and spaced from the shoulder, serrations on the collar, a bushing having an internal diameter less than the diameter of the serrated collar, said bushing moved into position against the shoulder whereby the serrations cut into the bushing, an annular flange on the bushing having one concave face, a disk mounted on the bushing and making substantially line contact with the periphery of the concave face of the flange, a resilient washer engaging the disk, an annular member surrounding the bushing and in contact with the washer, and a retaining member threadedly engaging the shaft and bearing against the annular member.

CECIL C. FAWCETT.